J. C. McCALL.
ICE MACHINE.
APPLICATION FILED FEB. 4, 1908.
912,873.
Patented Feb. 16, 1909.
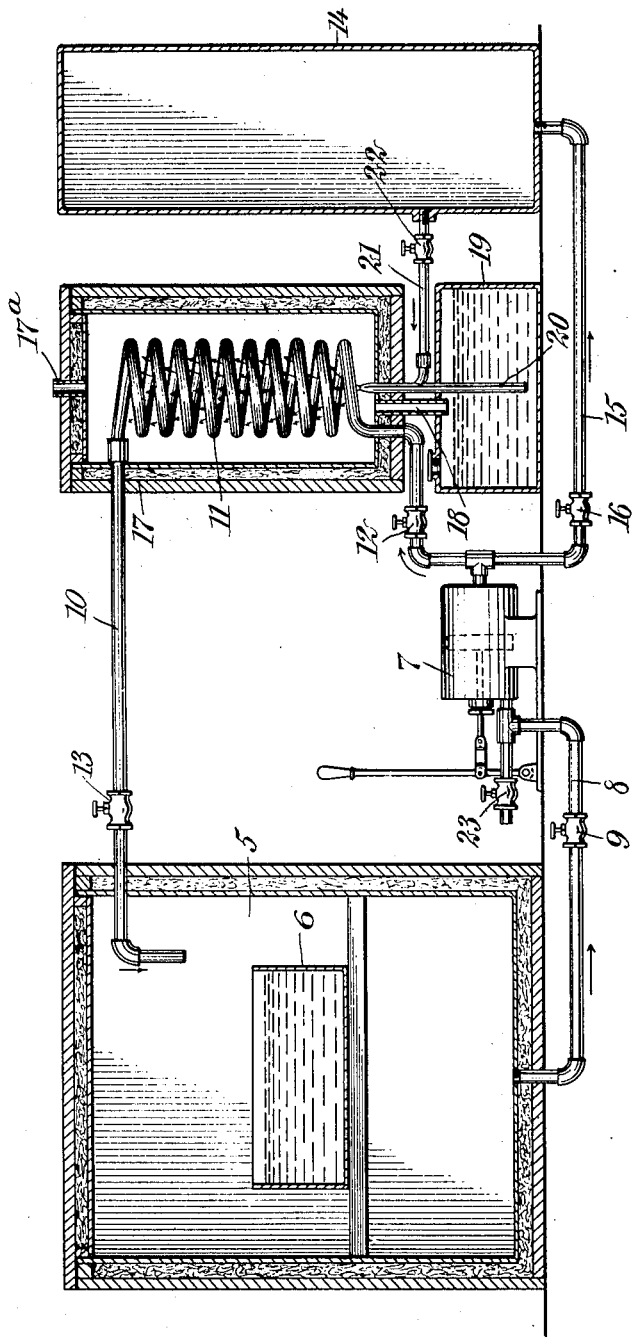
WITNESSES
INVENTOR
Jacob C. McCall
BY
ATTORNEYS

UNITED STATES PATENT OFFICE.

JACOB C. McCALL, OF COLORADO, TEXAS.

ICE-MACHINE.

No. 912,873.  Specification of Letters Patent.  Patented Feb. 16, 1909.

Application filed February 4, 1908. Serial No. 414,150.

*To all whom it may concern:*

Be it known that I, JACOB C. MCCALL, a citizen of the United States, and a resident of Colorado, in the county of Mitchell and State of Texas, have invented a new and Improved Ice-Machine, of which the following is a full, clear, and exact description.

This invention is an improved apparatus for the manufacture of ice in small quantities, more especially designed for those living in sparsely settled sections and isolated places, where they are unable to, or cannot reasonably, obtain a supply of ice from regular manufacturers.

The object of the invention is to provide an ice machine in which the freezing is effected by the alternate rarefaction and expansion of air in a sealed chamber in which a receptacle containing the water to be frozen is placed. To this end I connect the chamber at different points with the inlet and outlet of a pump, preferably manually operated, and provide the outlet connection with a coil in which the air is adapted to be compressed and cooled preparatory to its expansion in the chamber; the cooling of the coil being preferably accomplished by an atomized water spray, the air of which is supplied from the pump.

Reference is to be had to the accompanying drawing wherein is illustrated, partly in central section, an apparatus for making ice, embodying my invention.

More specifically described, the invention includes an air-tight chamber 5, the walls of which are suitably lined and insulated to prevent the dissipation of the cold. Within the chamber, preferably intermediate its height, is supported a receptacle 6, for containing the water to be frozen, which is accessible by removing a suitable portion of the casing, which, in the present instance, is shown to be its top.

A manually-operated pump 7 has its inlet connected with the casing through a pipe 8 which is provided with a controlling valve 9, and the outlet end of the pump is connected with the chamber above the receptacle through a pipe 10, the latter being provided with an upright coil or other suitable container 11 in its length and with valves 12 and 13 arranged at opposite sides of the coil. The outlet of the pump also connects with a pressure tank 14 through a pipe 15 which is provided with a controlling-valve 16. The coil 11 is surrounded by a casing 17 having a vent 17ª, and the walls of which are lined and insulated as in the case of the walls of the chamber 5, and is provided at its bottom with a drain pipe 18, leading into the upper portion of a small water tank 19. Passing within the tank 19 to a point near its bottom is an upright nozzle 20 which extends through the casing of the coil and discharges directly under the latter in the direction of its bore or longitudinal axis. Air from the pressure tank 14 is introduced into the nozzle above the tank by a pipe 21 having a controlling-valve 22.

The operation of the machine is as follows: After the receptacle 6 has been filled with water and the chamber 5 closed or sealed, the pump 7 is operated to exhaust the air from the chamber and compress it in the coil; the valves 9 and 12 at this time being open and the valves 13 and 16 closed. If the volume of air within the chamber is insufficient to obtain the desired compression in the coil, the air from the atmosphere may be lead directly into the pump, for which purpose I have shown a valve-controlled pipe 23. Air through this last-named valve may be introduced and compressed in the compression tank 14 by the aid of the pump, after closing the valves 9 and 12 and opening the valve 16. With the air compressed in the coil 11 and with an air pressure supply in the tank 14, the valve 22 is opened, which permits the passage of the air through the discharge end of the nozzle, drawing with it the water from the tank 19 and effectually breaking it up in an atomizing spray and discharging the same throughout the inside of the coil. The water as it drops in the coil casing passes through the drain pipe 18 into the tank 19, and is accordingly repeatedly used. The air from the spray escapes through the vent 17ª in the upper portion of the casing. After the coil has been reduced to a temperature as low as may be obtained by the spray, the valve 13 is opened, which releases the compressed air in the coil to the chamber, thereby greatly lowering the temperature, which, in connection with the dropping of the temperature resulting from the evaporation caused by the exhaustion of the air from the chamber, should be sufficient to freeze the water in the receptacle. If, however, the temperature is not sufficiently reduced for this purpose, the rarefaction and expansion of the air within the chamber, as hereinbefore described, may be repeated.

Having thus described my invention, I claim as new and desire to secure by Letters Patent:

1. The combination of an air-tight chamber, a receptacle adapted to contain water, within the chamber, an air compression tank, a container connected with the chamber, an air pump having a connection with the chamber at its inlet, and a connection at its outlet with the container and with the air compression tank, whereby the air may be exhausted from the chamber and compressed within the container and the tank, a water tank, and a nozzle having a connection with the water tank and air compression tank for directing an atomized spray on the container.

2. In an ice machine, the combination of a casing, an upright container in the casing into which a freezing medium is adapted to be compressed, a water tank, a drain leading from the casing to the water tank, a nozzle directed to the container, and means for introducing fluid pressure in the nozzle, whereby the water is drawn from the tank and sprayed on the coil and again returns to the water tank through the drain pipe.

3. In an ice machine, a container, a compression tank, a pump having means for compressing a freezing medium in either the container or tank, a water supply having a nozzle directed to the container, and means for passing the fluid pressure from the tank into the nozzle to atomize the water passing therethrough.

4. In an ice machine, the combination of a casing, an upright container in the casing into which a freezing medium is adapted to be compressed, a water tank under the casing, a drain pipe leading from the lower portion of the casing to the water tank, an upright nozzle passing from the water tank and directed on the container, and means for introducing fluid pressure into the nozzle for drawing the water therethrough from the tank and spraying it on the container.

5. The combination of an air-tight chamber, a receptacle within the chamber adapted to hold water, an air compression tank, a container having a valve-controlled connection with the chamber, an air pump having a connection between its inlet and the chamber, valve-controlled connections respectively between the container and compression tank and the outlet of the pump, a water tank, and a nozzle connected with the water tank having a connection with the compression tank.

In testimony whereof I have signed my name to this specification in the presence of two subscribing witnesses.

JACOB C. McCALL.

Witnesses:
 WALTER CLIFTON SHEPPARD,
 FRED FORD SAMPSON.